United States Patent
Von Berg

(10) Patent No.: US 9,251,576 B2
(45) Date of Patent: Feb. 2, 2016

(54) DIGITAL IMAGE SUBTRACTION

(75) Inventor: Jens Von Berg, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 417 days.

(21) Appl. No.: 13/381,689

(22) PCT Filed: Jun. 22, 2010

(86) PCT No.: PCT/IB2010/052825
§ 371 (c)(1),
(2), (4) Date: Jan. 23, 2012

(87) PCT Pub. No.: WO2011/001328
PCT Pub. Date: Jan. 6, 2011

(65) Prior Publication Data
US 2012/0121146 A1      May 17, 2012

(30) Foreign Application Priority Data
Jun. 30, 2009   (EP) .................................... 09164134

(51) Int. Cl.
*G06K 9/00* (2006.01)
*G06K 9/36* (2006.01)
*G06T 5/50* (2006.01)

(52) U.S. Cl.
CPC .......... *G06T 5/50* (2013.01); *G06T 2207/10116* (2013.01); *G06T 2207/20221* (2013.01); *G06T 2207/20224* (2013.01); *G06T 2207/30061* (2013.01)

(58) Field of Classification Search
USPC .................................. 382/128–132; 600/437
See application file for complete search history.

(56) References Cited

U.S. PATENT DOCUMENTS 7,620,229 B2    11/2009  Oosawa
2005/0105828 A1*  5/2005  Oosawa ..................... 382/294
(Continued)

FOREIGN PATENT DOCUMENTS

EP        0362849 A2    4/1990
JP        2007050045 A   3/2007
(Continued)

OTHER PUBLICATIONS

Shimizu et al "Registration method for interval change detection between two Chest X-ray images with different rotation angles", International Congress Series, Vil. 1268, Jun. 2004, pp. 917-922).*
(Continued)

*Primary Examiner* — Amara Abdi

(57) ABSTRACT

A system for generating a digital subtraction image of at least two input images. The system comprises a registration subsystem (1) for generating a plurality of different registrations of the input images (7, 8), based on different values of a registration parameter (6). The system further comprises a subtraction subsystem (2) for generating a plurality of subtracted images by subtracting the input images in accordance with respective ones of the plurality of registrations. The system further comprises a combining subsystem (3) for combining the plurality of subtracted images into a combined subtracted image (9). The registration parameter (6) represents an assumed depth of an object which is visible in the input images (7, 8). The combining subsystem (3) is arranged for assigning a combined pixel value to a pixel position of the combined subtracted image, based on pixel values of or around corresponding pixel positions in the plurality of subtracted images.

10 Claims, 2 Drawing Sheets

(56) References Cited

U.S. PATENT DOCUMENTS

2005/0259891 A1 11/2005 Sendai
2007/0237372 A1* 10/2007 Chen et al. .................. 382/128

FOREIGN PATENT DOCUMENTS

| JP | 2008142137 A | 6/2008 |
| WO | 2008129484 A2 | 10/2008 |

OTHER PUBLICATIONS

Luong et al, Flexible mask subtraction for digital angiography, IEEE, vol. 11, No. 3, Sep. 1992, pp. 407-415).*

Pasterkamp et al: "Discrimination of intravascular lumen and dissections in single intravascular ultrasound images using subtraction, conventional averaging and saline flush", ultrasound in medecine and biology, NY, US, vol. 21, No. 2, Jan. 1, 1995).*

Shimizu et al ("Registration method for interval change detection between two Chest X-ray images with different rotation angles", International Congress Series, Vii. 1268, Jun. 2004, pp. 917-922).*

Luong et al, (Flexible mask subtraction for digital angiography, IEEE, vol. 11, No. 3, Sep. 1992, pp. 407-415).*

G.S. Cox, "Automatic Registration of Temporal Image Pairs for Digital Subtraction Angiography", Proceedings of the International Society for Optical Engineering, vol. 2167, Jan. 1, 1994, pp. 188-199.

A. Shimizu et al, "Registration Method for Interval Change Detection Between Two Chest X-ray Images With Different Rotation Angles", International Congress Series, vol. 1268, Jun. 2004, pp. 917-922.

Luong Van Tran et al, "Flexible Mask Subtraction for Digital Angiography", IEEE Transactions on Mdiecal Imaging, vol. 11, No. 3, Sep. 1992, pp. 407-415.

Gerard Pasterkamp et al, "Discrimination of Intravascular Lumen and Dissections in Single Intravascular Ultrasound Images Using Subtraction, Conventional Averaging and Saline Flush", Ultrasound in Medicine and Biology, vol. 21, No. 2, Jan. 1, 1995, pp. 149-156.

Youcef Bentoutou et al, "Automatic Extraction of Control Points for Digital Subtraction Angiography Image Enhancement", IEEE Transactions on Nuclear Science, vol. 52, No. 1, Feb. 2005, pp. 238-246.

A. Macchia et al, "The Use of Digital Videoradiography by Image Subtraction in the Study of Female Stress Incontinence", The International Urogynecology Hournal, 1991, pp. 172-175.

Akinobu Shimizu et al, "A Novel Registration Method for Interval Change Detection Between Two Chext X-Ray Images With Different Rotation Angles", Acad. Radiol. vO. 13, 2006, pp. 503-511.

Matsuo, Y. et al. "Proposal of Interval Change Detection Method for Two Chest X-Ray Images with Different Rotation Angles of Human Body and Its Performance Evaluation", Graduate School of Bio-Applications and Systems Engineering, Tokyo, Japan, p. 164-175, D-II, vol. J87-D-II, (2004).

* cited by examiner

DIGITAL IMAGE SUBTRACTION

FIELD OF THE INVENTION

The invention relates to digital image subtraction.

BACKGROUND OF THE INVENTION

Subtraction images are a good means to visualize interval changes between follow-up images. The technique has been applied, for example, to thorax X-ray images. Some studies show that reporting accuracy and speed increase with the use of subtraction images. For example, a non-rigid 2D image registration method is used prior to subtraction of the current image in order to align corresponding anatomical parts. Ideally, the subtraction image should become medium grey except for the places where interval changes have occurred. The most prevalent reason for image artifacts in subtraction images is a difference in patient pose between both acquisitions. In particular, the patient may be rotated in between image acquisitions. For this reason, a technique has been proposed to compensate for a known patient rotation.

The paper "A novel registration method for interval change detection between two chest X-ray images with different rotation angles", by A. Shimizu et al., in: Acad. Radiol. 2006; 13:503-511, hereinafter: Shimizu, discloses a registration technique in which it is assumed that all the X-ray absorption recorded by an X-ray image has taken place in a coronal plane intersecting the patient. The position of this coronal plane is referred to as the depth of the shadow of interest. With this limitation, a synthetic radiographic image is constructed that compensates the difference in patient pose, and thus eliminates the artifacts which may occur in subtracted images when the anatomic structure is imaged from differing angles. According to Shimizu et al., when the depth of the shadow of interest is known from another clinical examination, such as tomography, a subtraction image is computed by registering the two images, based on the known patient rotation and known depth of the shadow of interest, and the interval change of the shadow is examined on the subtraction image. If the depth is unknown or interval changes are detected at different depths, the depth is continuously varied and a series of the subtraction images are constructed and interpreted. To this end, the clinical user observes a sequence of subtraction images with changing depth parameter.

SUMMARY OF THE INVENTION

It would be advantageous to have an improved system for generating a digital subtraction image of at least two input images. To better address this concern, in a first aspect of the invention a system is presented that comprises a registration subsystem for generating a plurality of different registrations of the input images, based on different values of a registration parameter;

a subtraction subsystem for generating a plurality of subtracted images by subtracting the input images in accordance with respective ones of the plurality of registrations;

a combining subsystem for combining the plurality of subtracted images into a combined subtracted image.

Since the plurality of subtracted images is combined into a single, combined subtracted image, the end user need only observe the combined subtracted image rather than a series of images. Consequently, the review of subtracted images may be performed more efficiently. A single, combined image may be generated which has reduced visibility of artifacts.

The registration parameter may represent an assumed depth of an object which is visible in the input images. Registration methods exist which can align the images, independent of the depth of the object, such that the object substantially is not visible in the subtracted image; however, the depth of the object may be unknown. Consequently, the registration and subtraction may be performed for a plurality of possible depths. The combining subsystem then combines the plurality of subtracted images such that the visibility of the object in the combined image is reduced to an acceptable level.

The registration subsystem may be arranged for registering the input images, based on a fixed rotation of an object represented by the input images. The amount of rotation of the object represented by the input images may be known beforehand, for example a number of degrees and an orientation of the rotation axis. For example, the patient may have rotated a given number of degrees in between two image acquisitions. However, since the depth of the different organs or objects inside the patient body is different, the effect of the rotation on the shift of the projected organs or objects as recorded in the X-ray images is different. By varying the depth parameter, a set of registered and subtracted images may be generated, the registration transformation which is used in each image depending on the depth parameter. This way, one of the plurality of subtracted images will be based on the 'right' depth of the object, and the subtraction artifact which belongs to that object will not be visible in that subtracted image.

The combining subsystem may be arranged for assigning a combined pixel value to a pixel position of the combined subtracted image, based on pixel values of or around corresponding pixel positions in the plurality of subtracted images. This way, the pixel values of the combined subtraction image may provide optimal subtracted image information with minimal artifacts, as can be achieved by combining the corresponding pixel values in the plurality of images.

The combining subsystem may comprise a selector for selecting, for a pixel position of the combined subtracted image, a pixel value at a corresponding pixel position in one of the plurality of subtracted images, based on a local image property at the pixel position. This way, the pixel value may be selected from that particular subtracted image in which the least artifacts are visible. Different pixel values for different pixel positions of the combined subtracted image may be taken from different subtracted images of the plurality of subtracted images.

The selector may be arranged for selecting the pixel value, based on feature information relating to a neighborhood of the pixel position. Such feature information can provide information as to whether artifacts are present in any particular one of the plurality of subtracted images. This helps to select the pixel value from an image without artifacts.

The combining subsystem may comprise an averaging subsystem for computing, for a pixel position, an average pixel value of the plurality of subtracted images, and assigning the average pixel value to the pixel position of the combined subtracted image. Average may be understood to be any of mean, median, or similar summarizing statistics. This way, artifacts may be averaged out.

The system may be incorporated into a medical workstation or into an image acquisition apparatus such as an X-ray apparatus.

A method of generating a digital subtraction image of at least two input images is provided, the method comprising generating a plurality of different registrations of the input images, based on different values of a registration parameter;

generating a plurality of subtracted images by subtracting the input images in accordance with different ones of the plurality of registrations; and combining the plurality of subtracted images into a combined subtracted image.

A computer program product may comprise instructions for causing a processor system to perform the method or the functions of the system set forth.

It will be appreciated by those skilled in the art that two or more of the above-mentioned embodiments, implementations, and/or aspects of the invention may be combined in any way deemed useful.

Modifications and variations of the image acquisition apparatus, of the workstation, of the system, and/or of the computer program product, which correspond to the described modifications and variations of the system, can be carried out by a person skilled in the art on the basis of the present description. A person skilled in the art will appreciate that the method may be applied to different kinds of image data, acquired using for example X-ray or ultrasound (US).

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
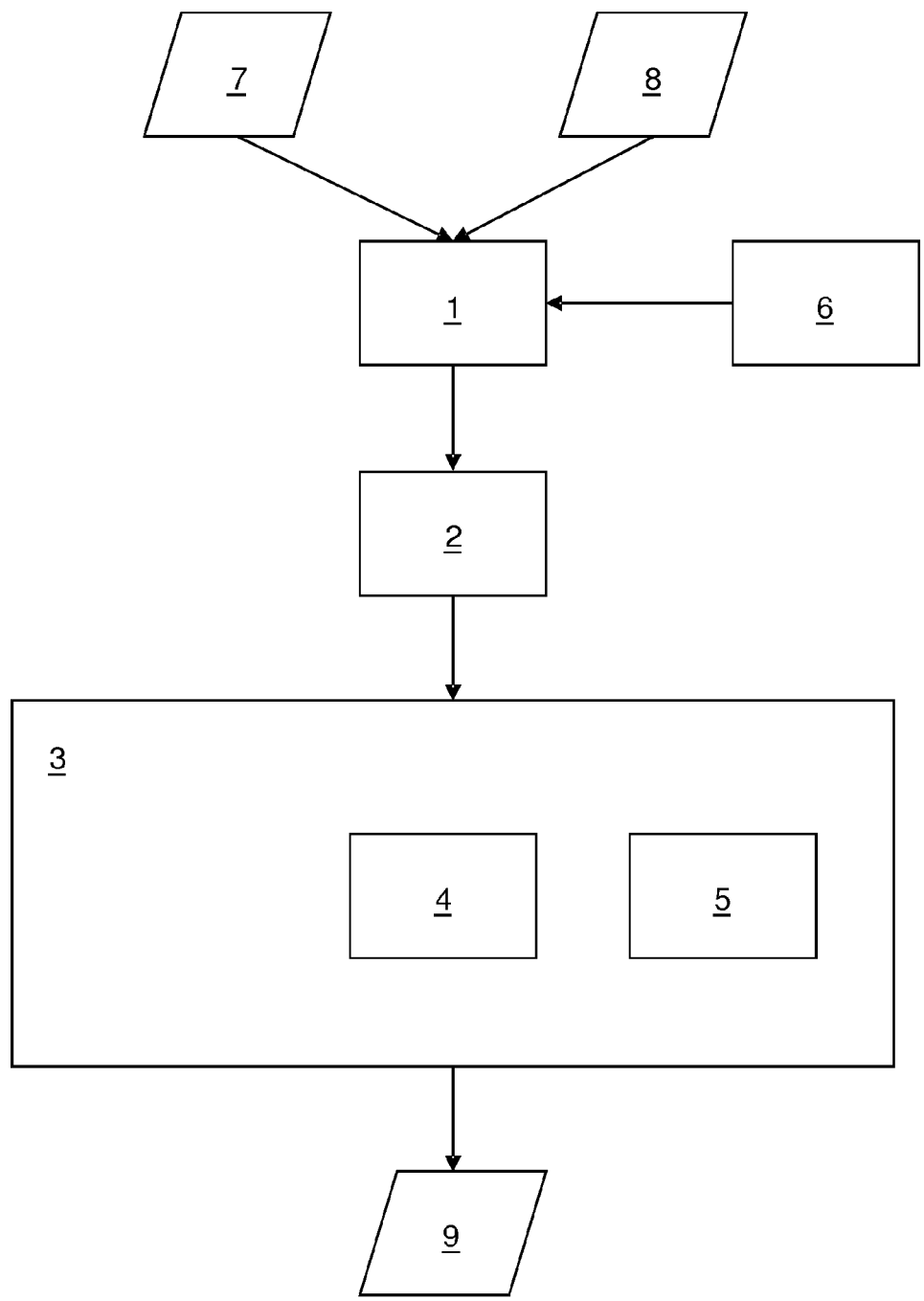
FIG. 1 shows a block diagram of a system for generating a digital subtraction image of at least two input images.

FIG. 1 shows a block diagram of a system for generating a digital subtraction image of at least two input images. The system may be implemented, for example, in a computer workstation, such as a medical imaging workstation. Alternatively, the system may be implemented using dedicated hardware, for example an electronic circuit. The system may also be included in a medical image acquisition apparatus. In such a case, the medical image acquisition apparatus may generate subtracted images from input images acquired by the medical image acquisition apparatus itself, and/or from input images from different sources. The system may have a communications port for exchanging data with other entities. For example, the communications port comprises a network connection for connecting the system with an image repository, such as a PACS system, for receiving input images and/or storing combined subtracted images. The system may further comprise a display for showing input images and/or combined subtracted images to a user. Moreover, a user interface may be provided to enable a user to control the operation of the system. The several subsystems of the system may be implemented by means of, for example, software codes or hardware elements. A subsystem can comprise any means to perform a specific function. The Figure shows, as an example, two input images 7 and 8. However, more input images may be provided. These images may be registered with each other and subtracted one after the other by the subsystems described hereinafter.

The system may comprise a registration subsystem 1 for generating a plurality of different registrations of the input images 7, 8, based on different values of a registration parameter 6. The system may further comprise a subtraction subsystem 2 for generating a plurality of subtracted images. The subtraction subsystem 2 may generate the plurality of subtracted images by subtracting the input images in accordance with respective ones of the plurality of registrations. The system may further comprise a combining subsystem 3 for combining the plurality of subtracted images into a combined subtracted image 9.

The registration parameter 6 may represent an assumed depth of an object which is visible in the input images 7, 8. A two-dimensional image in principle gives two coordinates of an object parallel to the image plane. The depth relates to a third coordinate of the object, which may be more or less perpendicular to the image plane.

The registration subsystem 2 may be arranged for registering the input images 7, 8, based on a fixed rotation of an object represented by the input images. For example, the rotation parameters are given except for the origin of rotation. The origin of rotation is determined based on the registration parameter 6, which may be the depth. Consequently, a plurality of registrations is generated by the registration subsystem; these registrations may be based on identical rotation values but differing rotation origins (with respect to the object which is imaged). Alternatively, the registrations may be based on different rotation angles and/or different rotation directions. In such a case, the rotation angle and/or rotation direction is part of the registration parameter 6. Alternatively, the registration parameter may be indicative of a rigid translational shift of the images with respect to each other.

The combining subsystem 3 may be arranged for assigning a combined pixel value to a pixel position of the combined subtracted image, based on pixel values of or around corresponding pixel positions in the plurality of subtracted images. The combined subtracted image may have pixels which are based on the pixels of the plurality of subtracted images. A pixel location of the combined subtracted image may be assigned a pixel value which is based on the pixel values of that pixel location in the plurality of subtracted images. A pixel location of the combined subtracted image may alternatively be assigned a pixel value which is based on the pixel values of pixel locations around that pixel location in the plurality of subtracted images. This allows taking into account for example the presence of any artifacts in one of the plurality of subtracted images, in the neighborhood of a pixel location. If such artifacts are detected in an image, this image is not allowed to influence that pixel location in the combined subtracted image too much, if at all.

The combining subsystem 3 may comprise a selector 4 for selecting, for a pixel position of the combined subtracted image, a pixel value at a corresponding pixel position in one of the plurality of subtracted images, based on a local image property at the pixel position. For example, of the plurality of subtracted images, one is chosen which does not have artifacts at the pixel position. Such artifacts may be detected, for example, by detecting edges in the neighborhood of the pixel position. The fewer edges, the lower the probability that there are artifacts in an image. Alternatively, the entropy of a portion of the image may be computed. Low entropy may be indicative of fewer artifacts. For example, the selector 4 may be arranged for selecting the pixel value, based on feature information relating to a neighborhood of the pixel position.

The combining subsystem 3 may comprise an averaging subsystem 5 for computing, for a pixel position, an average pixel value of the plurality of subtracted images, and assigning the average pixel value to the pixel position of the combined subtracted image. This way, all subtracted images are taken into account in the computation of a pixel of the subtracted images. The average may be weighted, based on the local feature information, as described in relation to the selector 4 above.

Figure 2:
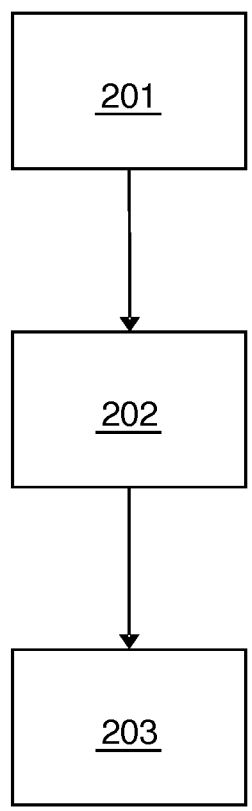
FIG. 2 shows a flow chart illustrating steps of a method of generating a digital subtraction image of at least two input images.

FIG. 2 illustrates a method of generating a digital subtraction image of at least two input images, comprising a step 201 of generating a plurality of different registrations of the input images, based on different values of a registration parameter. The method further comprises a step 202 of generating a plurality of subtracted images by subtracting the input images in accordance with different ones of the plurality of registrations. The method further comprises a step 203 of combining the plurality of subtracted images into a combined subtracted image. The method, or variations thereof, may be implemented by means of a computer program product comprising instructions for causing a processor system to perform the steps of the method.

The system may be arranged to find an image, say $I'(x,y)$, based on the plurality of subtracted images, say $S(x,y,d)$. Herein, x and y are image coordinates, d represents the registration parameter 6, $I'(x,y)$ represents the image intensity of the combined subtracted image at coordinates (x,y), and $S(x,y,d)$ represents the image intensity of the subtracted image, based on registration parameter d at coordinates (x,y). I' may be computed according to a function f, as in the expression $I'(x_1,y_1)=f(S(x_1,y_1,d))$, such that only the intensity of the corresponding pixel is considered in each of the plurality of subtracted images. Examples are: an average image $I'_a(x_1,y_1)=\Sigma_d(x_1,y_1,d))$, or a minimum projection image $I'_m(x_1,y_1)=\mathrm{argmin}_d(\|S(x_1,y_1,d)\|)$. Alternatively, I' may be computed using the more general form $I'(x_1,y_1)=f(S(x,y,d))$, and consider all of the subtracted images or a region of the subtracted images around a given pixel $\{x_1,y_1\}$. An example is for instance to consider pattern intensity, which is based on the amount of edges around a point. Also, a regularizing term may be included. For example, a smoothness constraint may be imposed on the function $d_0(x,y)$, wherein $d_0(x,y)$ represents the registration parameter of the image whose pixel value is assigned to $I'(x,y)$, in other words, $I'(x,y)=S(x,y,d_0(x,y))$.

It will be appreciated that the invention also extends to computer programs, particularly computer programs on or in a carrier, adapted for putting the invention into practice. The program may be in the form of source code, object code, a code intermediate source and object code such as a partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via an electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a digital subtraction image of at least two input images, comprising:
    a registration subsystem for generating a plurality of different registrations of the input images, based on different values of a registration parameter, each different registration represents a different assumed depth and a different rotation origin of an object visible in each of the input images;
    a subtraction subsystem for generating a plurality of subtracted images by subtracting the input images in accordance with respective ones of the plurality of registrations;
    a combining subsystem for combining the plurality of subtracted images into a single combined subtracted image, and the single combined subtracted image is a single frame image.

2. The system according to claim 1, wherein the registration subsystem registers the input images, based on a fixed rotation of an object represented by the input images.

3. The system according to claim 1, wherein the selector selects the pixel value, based on feature information relating to a neighborhood of the pixel position.

4. A medical workstation comprising a system according to claim 1.

5. A medical image acquisition apparatus comprising a system according to claim 1.

6. A method of generating a digital subtraction image of at least two input images, comprising:
    generating a plurality of different registrations of the input images, based on different values of a registration parameter, each value represents a different assumed depth and a different rotation origin of an object which is visible in the input images;

generating a plurality of subtracted images by subtracting the input images in accordance with different ones of the plurality of registrations; and combining the plurality of subtracted images into a single combined subtracted image, and the single combined subtracted image is a single frame image.

7. A non-transitory computer readable medium comprising instructions for causing a processor system to perform the method according to claim 6.

8. The method of claim 6, wherein the registrations are further based on registering the input images based on a fixed rotation of the at least two images.

9. The method of claim 6, wherein the registering of the input images is based on a fixed rotation of an object represented by the input images.

10. The method of claim 6, further comprising selecting the pixel value, based on feature information relating to a neighborhood of the pixel position.

\* \* \* \* \*